(12) United States Patent
Mosdal et al.

(10) Patent No.: US 6,402,180 B1
(45) Date of Patent: Jun. 11, 2002

(54) IMPLEMENT HITCH

(75) Inventors: Brian Thomas Mosdal, Ankeny; James Thomas Noonan, Johnston; Paul David Parker, Ankeny; David Alan Payne, Urbandale; Anthony Scott Royer, Adel, all of IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/532,116

(22) Filed: Mar. 21, 2000

(51) Int. Cl.$^7$ ............................................. A01B 63/02
(52) U.S. Cl. ...................... 280/504; 280/495; 280/457; 172/439
(58) Field of Search ................................. 280/504, 457, 280/456.1, 432, 500, 495; 172/439, 677

(56) References Cited

U.S. PATENT DOCUMENTS

| | | | | |
|---|---|---|---|---|
| 2,815,225 A | * | 12/1957 | Barcafer ..................... | 280/457 |
| 3,697,099 A | * | 10/1972 | Potts et al. ................. | 280/457 |
| 4,350,362 A | * | 9/1982 | Landers .................. | 280/478 A |
| 4,352,505 A | * | 10/1982 | Chambers .................. | 280/495 |
| 4,450,598 A | * | 5/1984 | Larsen ........................ | 14/71.1 |
| 4,614,354 A | * | 9/1986 | Stagner .................. | 280/415 R |
| 5,394,947 A | * | 3/1995 | Essex et al. ................ | 172/439 |
| 5,873,595 A | * | 2/1999 | Hinte ......................... | 280/504 |
| 5,975,552 A | * | 11/1999 | Slaton ..................... | 280/478.1 |
| 6,187,451 B1 | * | 2/2001 | Boos .......................... | 428/598 |

* cited by examiner

Primary Examiner—Avraham H. Lerner

(57) ABSTRACT

A hitch link structure includes two hitch tubes angled with respect to each other and having forward ends connected by upper and lower hitch plates welded to the tubes. The plates include weld cutouts designed so the same plates can be used with a variety of different hitch tube angles, depending on the width of the mainframe hitch mount-up. Three apertures in the forward end of each of the plates receive bolts which connect the selected hitch link to the plates. The apertures also act as weld fixturing locators to speed hitch construction. The weld cutouts, in generally a half moon configuration, facilitate low cost fillet welds at easily accessible locations regardless of hitch tube angle and facilitate fillet weld connections in relatively lowly stressed areas. The lower plate is apertured to define an intermediate support hole for the safety chain, and the central bolt connecting the hitch link also attaches to the safety chain so the chain is accommodated without additional parts.

12 Claims, 2 Drawing Sheets

IMPLEMENT HITCH

BACKGROUND OF THE INVENTION

1) Field of the Invention

The present invention relates generally to pull-type agricultural implements and, more specifically, to a hitch for such implements.

2) Related Art

Conventional hitch and hitch link structures presently used on drawn implements such as chisel plows, field cultivators and seeding equipment include numerous parts and require extensive welding. As a result, these structures are relatively expensive to manufacture and are more prone to reliability problems. Further, different implements require different hitch frame angles and therefore different parts. Different implement main frame widths on one type of implement require hitch structures of different dimension. The various fixturing and part requirements for the varying hitch structures increase the number of parts as well as the cost and complexity of the manufacturing process.

Hitch structures also include safety chain mounting structure. Safety chains are usually attached using a separate set of bolts and a separate plate for intermediate support, thereby further increasing the time and number of necessary parts for the manufacture of the hitch structure.

BRIEF SUMMARY OF THE INVENTION

It is therefore an object of the present invention to provide an improved hitch link structure. It is a further object to provide such an improved structure that overcomes most or all of the aforementioned problems.

It is a further object of the present invention to provide an improved hitch link structure that is simpler and less expensive to manufacture than at least most previously available hitch link structures. It is a further object to provide such a hitch link structure that requires a minimum number of parts and which is higher in quality than at least most of the previous structures.

It is still another object of the present invention to provide an improved hitch link structure wherein common components can be used for a variety of different hitch tube angles and sizes. It is yet another object to provide such a structure which accommodates a safety chain without need for additional components.

It is yet another object of the present invention to provide an improved hitch link structure including plates for receiving different hitch links, the plates including apertures utilized to connect a link and which facilitate fixturing for hitch manufacture. It is a further object to provide such structure wherein one of the plates includes a safety chain intermediate support hole and one of the bolts connecting the hitch link to the plates attaches the safety chain to the hitch.

A hitch link structure constructed in accordance with the teachings of the present invention includes two hitch tubes angled with respect to each other and having forward ends connected by upper and lower hitch plates welded to the tubes. The plates include weld cutouts designed so the same plates can be used with a variety of different hitch tube angles, depending on the width of the mainframe hitch mount-up. Three apertures in the forward end of each of the plates receive bolts which connect the selected hitch link, clevis or standard to the plates. The apertures also act as weld fixturing locators to speed hitch construction. The weld cutouts, in generally a U-shaped configuration with a rounded inner portion and parallel sidelegs embracing the sidewalls of the tubes, facilitate low cost fillet welds at easily accessible and relatively lowly stressed locations along the sidelegs, outside the tube, regardless of hitch tube angle.

The lower plate is apertured to define an intermediate support hole for the safety chain, and the central bolt connecting the hitch link also attaches to the safety chain so the chain is accommodated without additional parts. The hitch construction is simpler yet stronger and more reliable than most previously available constructions. In addition, the components are adaptable to different hitch angles so the number of parts required for different families of different hitch types is substantially reduced.

In a second embodiment of the invention, a single hitch tube includes a forward end with opposed sets of walls, and a pair of plates are notched and received over one set of the walls. Welds adjacent the notched areas connect the plates with the walls at easily accessible locations. The hitch link and chain are connected in a manner similar to that described above for the hitch which includes two angled tubes, and the single tube structure has many of the same advantages outlined above.

These and other objects, features and advantages of the present invention will become apparent to one skilled in the art upon reading the following detailed description in view of the drawings.

DETAILED DESCRIPTION OF THE DRAWINGS

Figure 1:
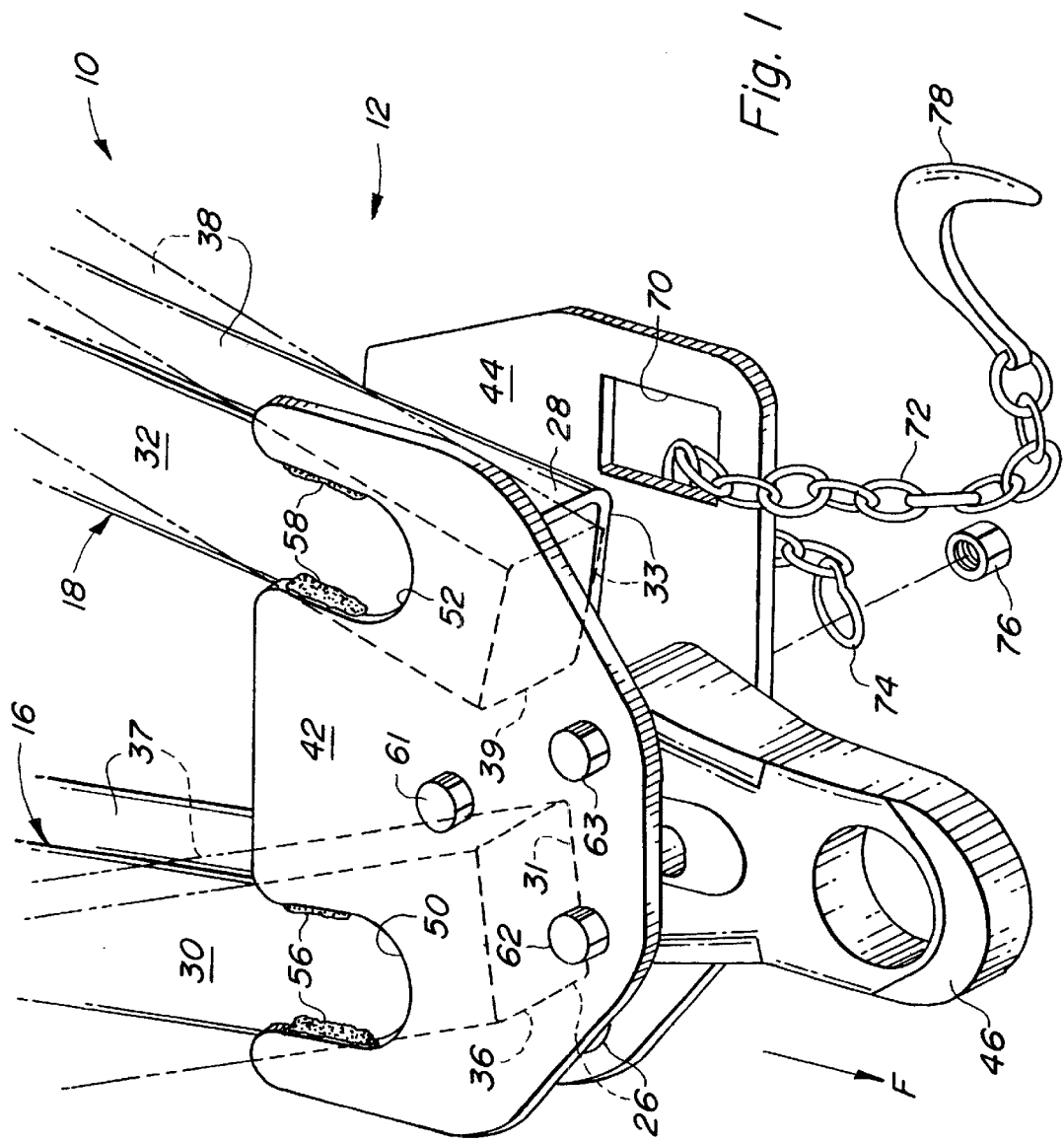
FIG. 1 is a top perspective view of the link mounting plate area of an implement hitch showing a first hitch tube angle (solid lines) and a different hitch tube angle (broken lines).

Referring now to FIG. 1, therein is shown the forward portion of an implement 10 such as a field cultivator or chisel plow. The implement 10 includes hitch structure 12 for connection to a towing vehicle (not shown) such as a tractor for forward movement (F) over the ground.

The hitch structure 12 includes two forwardly converging hitch tubes 16 and 18 with forward ends 26 and 28 having rectangular cross sections including parallel top and bottom walls 30, 31 and 32, 33 connected by sidewalls 36, 37 and 38, 39. The forward ends 26 and 28 are supported with the top walls 30 and 32 lying in a first plane and the bottom walls 31 and 33 lying in a second plane offset from and parallel to the first plane. The aft ends (not shown) of the hitch tubes 16 and 18 extend rearwardly to connections with the implement frame, and the angle of the tubes 16 and 18 relative to each other is dependent on the implement size and type.

The forward ends 26 and 28 are supported between first and second plates 42 and 44 secured to the top and bottom surfaces, respectively, of the walls 30, 32 and 31, 33. A hitch link 46 is connected between the plates 42 and 44 at a central location adjacent the forward ends 26 and 28.

The hitch plates 42 and 44 include identical notches 50 and 52 opening rearwardly in the direction of the length of the tubes 16 and 18 (only the notches for the plate 42 are shown but the notches for the plate 44 are similarly shaped and located). The notches 50 and 52 are U-shaped with the sidelegs of the U being parallel and extending over the top walls 30 and 32 and under the bottom walls 31 and 31 inwardly from the respective sidewalls. The bight portion of the U-shaped configuration is generally semicircular. The configuration and location of the notches 50 and 52 accommodates a variety of hitch tube angles (see, for example, the broken lines of FIG. 1) while retaining the legs of the U-shaped configurations adjacent the respective walls 30–33 without interruption. Edge portions 56 and 58 of the notches 50 and 52 are welded rearwardly of the semicircular portion of each notch along the sidelegs. The resulting fillet welds are strong and in easily accessible locations for improved manufacturability. High stress areas around the semicircular portions remain unwelded to reduce or eliminate incidences of stress cracks and improve reliability. Because the notches 50 and 52 align properly with the top and bottom walls of the hitch tubes for many different tube angles, the same plates 42 and 44 can be utilized for a variety of hitch types and implement sizes.

As shown in FIG. 1, forward central portions of the plates 42 and 44 are apertured to receive bolts 61, 62 and 63 which extend through corresponding apertures in the hitch link 46 to secure the link between the plates forwardly of the tubes 16 and 18. In addition to receiving the bolts 61–63 which secure the hitch link 46, the apertures in the plates 42 and 44 provide fixturing locations during manufacturing.

The lower plate 44 includes a rectangularly shaped opening 70 outwardly of the forward end 28 of the tube 18 to provide intermediate support for a safety chain 72. One end 74 of the chain is secured to the hitch structure by the bolt 61 and a nut 76 and large washer (not shown). An opposite end 78 of the chain is connected to the towing vehicle. Making the chain support integral with the hitch plate and using the hitch link connecting bolt to secure the chain reduces the number of necessary parts and the cost of manufacturing.

Figure 2:
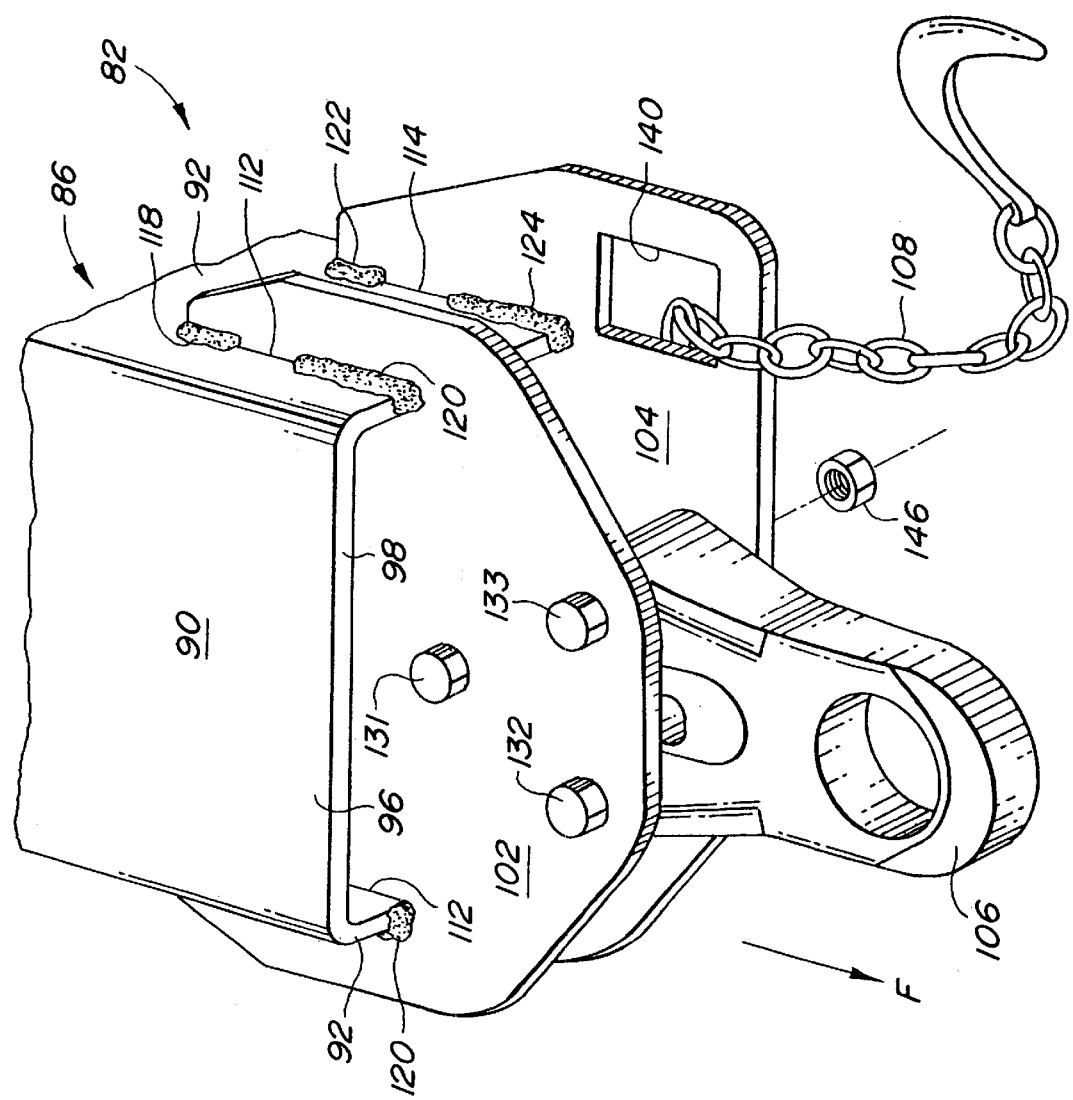
FIG. 2 is a top perspective view of the link mounting plate area of an implement hitch having a single hitch tube.

In another embodiment of the invention (FIG. 2), a hitch structure 82 includes a single fore-and-aft extending tube 86 of rectangular cross section with top and bottom walls 90 connected by sidewalls 92. The tube 86 has a leading end 96 opening in the forward direction (F). The leading end 96 defines a tube edge 98 which generally lies in an upright plane. First and second plates 102 and 104 are secured to the leading end 96 and support a hitch link 106 adapted for attachment to a towing vehicle. A safety chain 108 is supported by the hitch structure 82.

The first or upper plate 102 includes rearwardly opening notches at 112 which are transversely spaced a distance approximately equal to the distance between the sidewalls 92, and the width of the notches is slightly larger than the width of the sidewalls 92. The notches at 112 include sides which extend parallel to each other and parallel to the sidewalls 92. The second or lower plate 104 includes rearwardly opening notches at 114 which are spaced and configured generally identically to those at 112 in the plate 102.

The first plate 102 is positioned in the leading end 96 with the sides of the notches at 112 embracing the inner and outer surfaces of the sidewalls 92. Fillet welds at locations 118 and 120 between the upper portions of the outer sides of the notches at 112 and the outer surfaces of the sidewalls 92 secure the plate 102 to the tube 86 in slightly offset, parallel relationship with the top wall 90. The four weld locations are easily accessible and provide a strong, reliable connection of the plate 102 with the tube 86. Welds at extremely highly stressed areas of the plate 102 are avoided. Similarly, the plate 104 is positioned in the leading end 96 below and parallel to the plate 102, offset slightly above the bottom wall of the tube 86. The sides of the notches at 114 embrace the sidewalls 92, and fillet welds are provided at locations 122 and 124 in a generally identical manner to the welds 118 and 120 for the plate 102. Again, the weld locations are easily accessible and provide a strong, reliable connection between the plate 104 and the tube 86.

Bolts 131, 132 and 133 extending through aligned holes in the plates 102 and 104 and through corresponding holes in the hitch link 106 secure the hitch link in a central, forward position relative to the leading end 96 of the tube 86. The leading side of the lower plate 104 is apertured at 140 to provide an intermediate support for the chain 108. One end of the chain 108 is connected to the bolt 131 with a nut 146 and a large washer (not shown).

Having described the preferred embodiment, it will become apparent that various modifications can be made without departing from the scope of the invention as defined in the accompanying claims.

What is claimed is:

1. In an implement adapted for connection to a towing vehicle for forward movement over the ground, hitch structure comprising:

first and second hitch tubes converging in the forward direction at an angle relative to each other depending on implement size, the hitch tubes having forward ends in close proximity to each other, the forward ends including upper and lower surfaces extending generally parallel to each other;

an upper plate extending between the tubes over the upper surfaces;

a lower plate extending between the tubes below the lower surfaces;

the plates having notched configurations including notches with sides located adjacent the upper and lower surfaces and a rounded portion connecting the sides; and welds connecting the sides of the notches with the upper and lower surfaces, wherein the rounded portions are substantially free of welds.

2. The hitch structure as set forth in claim 1 wherein the notches align with the surfaces over different preselected angles to facilitate welded connections of the hitch tubes at the different angles so that the preselected configurations can be utilized to manufacture hitches for different implement sizes and types.

3. The hitch structure as set forth in claim 2 wherein the notches open rearwardly and the sides extend generally in the direction of the hitch tubes.

4. The hitch structure as set forth in claim 1 wherein the plates are apertured, and including a hitch link connected by bolts extending through apertures in the plates, wherein the apertures provide fixturing locations for the hitch structure during manufacture of the hitch structure.

5. The hitch structure as set forth in claim 1 wherein one of the plates includes an aperture, and further including a safety chain received in the aperture.

6. The hitch structure as set forth in claim 1 wherein the plates are connected to the forward ends exclusively by welds extending between the plates and the top and bottom surfaces.

7. In an implement adapted for connection to a towing vehicle for forward movement over the ground, hitch structure comprising:

first and second hitch tubes converging in the forward direction at an angle relative to each other depending on implement size, the hitch tubes having forward ends in close proximity to each other, the forward ends including upper and lower surfaces extending generally parallel to each other;

an upper plate extending between the tubes over the upper surfaces;

a lower plate extending between the tubes below the lower surfaces;

the plates having preselected configurations including notches with sides located adjacent the upper and lower surfaces;

welds connecting the sides of the notches with the upper and lower surfaces;

wherein one of the plates includes an aperture, and further including a safety chain received in the aperture; and a bolt connecting the hitch link to the plates, and wherein the bolt also connects the safety chain to the plates so that the safety chain is connected to the plates without need for additional connecting hardware.

8. In an implement adapted for connection to a towing vehicle for forward movement over the ground, hitch structure comprising:

first and second fore-and-aft extending hitch tubes converging in the forward direction at an angle relative to each other depending on implement size, the hitch tubes having forward ends in close proximity to each other, the forward ends including surfaces generally lying in a plane;

a plate positioned against the surfaces and extending between the hitch tubes, the plate including a rearward portion having notches opening in the rearward direction adjacent the surfaces, the notches including inner rounded portions and generally parallel sidelegs extending rearwardly from the rounded portions; and welds connecting the plate to the surfaces, the welds extending generally in the fore-and-aft direction between portions of the notches adjacent the parallel sidelegs and the surface and wherein the rounded portions are substantially free of welds.

9. The hitch structure as set forth in claim 8 wherein the plate includes an apertured portion, and a hitch link connected to the plate by bolts extending through the apertured portion.

10. The hitch structure as set forth in claim 9 wherein the notches align with the surface over different preselected angles to facilitate welded connections of the hitch tubes at the different angles so that substantially identically configured plates can be utilized to manufacture hitches having different hitch tube angles.

11. The hitch structure as set forth in claim 8 wherein areas of the plate along the rounded portions of the notches comprise highly stressed areas and are characterized by the absence of a weld in the highly stressed areas.

12. In an implement adapted for connection to a towing vehicle for forward movement over the ground, hitch structure comprising:

first and second fore-and-aft extending hitch tubes converging in the forward direction at an angle relative to each other depending on implement size, the hitch tubes having forward ends in close proximity to each other, the forward ends including surfaces generally lying in a plane;

a plate positioned against the surfaces and extending between the hitch tubes, the plate including a rearward portion having notches opening in the rearward direction adjacent the surfaces, the notches including inner rounded portions and generally parallel sidelegs extending rearwardly from the rounded portions;

welds connecting the plate to the surfaces, the welds extending generally in the fore-and-aft direction between portions of the notches adjacent the parallel sidelegs and the surface;

wherein the plate includes an apertured portion, and a hitch link connected to the plate by bolts extending through the apertured portion; and a chain connected to one of the bolts and extending through an opening in the plate.

\* \* \* \* \*